Feb. 16, 1965 E. F. KOVANIC ETAL 3,170,073

NON-INVERTING BISTABLE CIRCUIT COMPRISING TUNNEL DIODE-TRANSISTOR COMBINATION, THE OUTPUT HAVING BOTH VOLTAGE AND CURRENT GAIN

Filed July 21, 1961

INVENTORS E.F. KOVANIC
R.H. WACHSMAN
BY R. B. Ardis
ATTORNEY

United States Patent Office 3,170,073

Patented Feb. 16, 1965

3,170,073

NON-INVERTING BISTABLE CIRCUIT COMPRISING TUNNEL DIODE-TRANSISTOR COMBINATION, THE OUTPUT HAVING BOTH VOLTAGE AND CURRENT GAIN

Edward F. Kovanic, Livingston, N.J., and Richard H. Wachsman, New York, N.Y., assignors to Bell Telephone Laboratories, Incorporated, New York, N.Y., a corporation of New York Filed July 21, 1961, Ser. No. 125,812
2 Claims. (Cl. 307—88.5)

This invention relates generally to binary counters and more particularly to binary counters employing tunnel diodes as active elements.

Because of their high speed, tunnel diodes operated in a bistable mode respond to trigger pulses of extremely short duration, but because their output voltage level is quite low the output is difficult to use. The transistor, on the other hand, does not respond as well as the tunnel diode to short trigger pulses but it operates at a much higher voltage level. Accordingly, in the prior art the transistor and the tunnel diode have been combined to take advantage of the most desirable features of both devices and a typical combination devised, wherein the tunnel diode is connected in parallel with the input to the transistor, is shown on page 153 of the General Electric Transistor Manual, 5th Ed., copyright 1960. The circuits employed in the prior art, of which the above is typical, have a shortcoming, however, in that it is not possible to obtain an output signal which is in phase with the input signal at a point in the circuit which also provides both voltage and current gain. In order to obtain such an output a second transistor is required for phase reversal and although such a transistor will provide still further gain it increases the switching time of the entire circuit and therefore destroys much of the advantage gained by the use of the tunnel diode.

It is an object of this invention therefore to decrease the switching time in a non-inverting bistable circuit employing a tunnel diode-transistor combination having both voltage and current gain at the output.

It is a related object of this invention to eliminate the necessity for a second transistor in a noninverting bistable circuit employing a tunnel diode-transistor combination having both voltage and current gain at the output.

In accordance with this invention a bistable circuit employing a tunnel diode and a transistor amplifier is provided in which the "turn on," or low impedance state, of the tunnel diode "turns on" or causes the transistor to conduct, and the "turn off," or high impedance state, of the tunnel diode "turns off" or causes the transistor to be non-conducting. This circuitry retains the high speed of the tunnel diode and provides a non-inverted output at the transistor relative to the input to the tunnel diode which output has both voltage and current gain.

Figure 1:
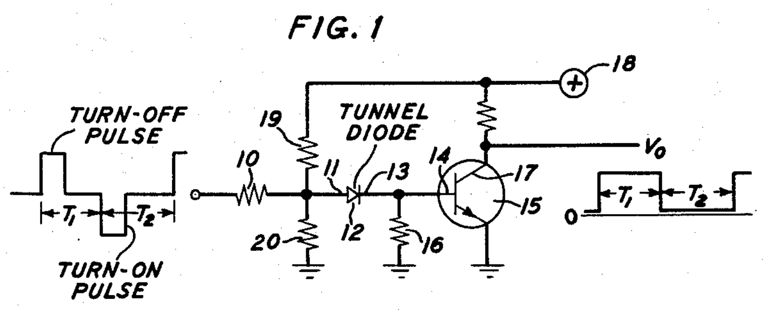
Figure 2A:
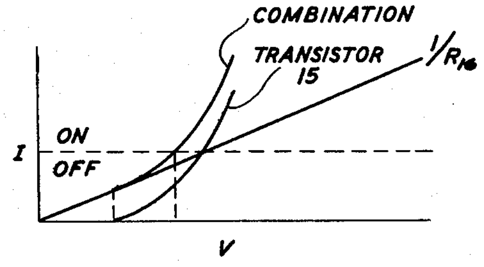
Figure 2B:
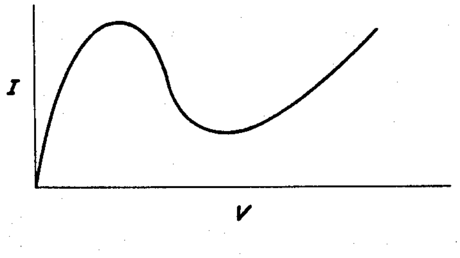
Figure 2C:
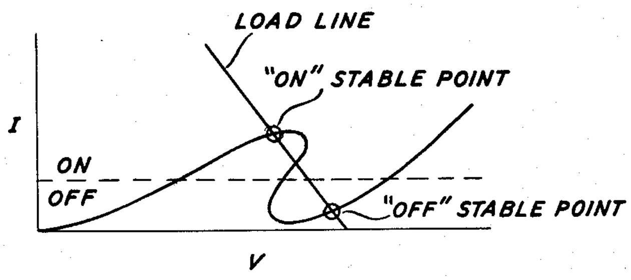

The invention will be more fully understood from the following detailed description of a preferred embodiment thereof taken in conjunction with the appended drawings, in which:

FIG. 1 is a schematic diagram of a bistable circuit embodying the invention; and FIGS. 2A, 2B and 2C are a series of drawings showing the current versus voltage characteristics of the circuit shown in FIG. 1.

A tunnel diode like other semiconductor diodes consists simply of a p-n junction with an electrode connected to each region thereof. Unlike other semiconductor diodes, however, the barrier or space charge layer is extremely thin and is formed between two very heavily doped regions. As a result of this combination of thin barrier and heavy doping the tunnel diode is highly conductive for all values of reverse voltage. In the forward bias region the diode initially has positive conductance and the current initially increases with voltage, reaches a sharp maximum, then drops to a broad minimum, and finally increases exponentially, with positive conductance, in response to higher values of forward voltage. The region between the sharp maximum and the broad minimum is a region of negative conductance.

The tunnel diode equivalent circuit that has found general acceptance consists of the following components connected in series: an inductance $L_T$ which represents the sum of the diode series inductance, circuit lead inductance and lumped inductance seen by the diode, a resistor $R_T$ which represents the sum of the diode series resistance, internal resistance of the power supply seen by the diode and load resistance seen by the diode, and the parallel combination of a capacitor C which is the junction capacitance and a resistor $-G$ which is the negative conductance.

Admittance analysis of this equivalent circuit reveals that the tunnel diode circuit cannot be biased in a stable manner in the negative conductance region if $R_T$ is greater than the reciprocal of the negative conductance, $$\frac{1}{|-G|}$$

and the diode will remain in either the first or the second region of positive conductance and will proceed abruptly from one to the other.

A bistable circuit employing a tunnel diode-transistor combination embodying the invention is shown in FIG. 1. The tunnel diode is biased in its high conductance region so that a positive input pulse applied by means of resistor 10 to an electrode 11 attached to the p-type region of the tunnel diode 12, which electrode may be designated the anode, triggers the tunnel diode 12 from its low impedance state to its high impedance state, while negative input pulses trigger the tunnel diode back to its low impedance state. The electrode 13 attached to the n-type region of the tunnel diode, which electrode may be designated the cathode, is connected to the base 14 of n-p-n type transistor 15 which is connected in the common emitter configuration and also to a resistor 16 whose resistance value is small compared to the input impedance of the transistor in its high impedance state but large compared to the input impedance of the transistor in its low impedance state.

The result of such an interconnection is that a positive input pulse causes the tunnel diode 12 to assume its high impedance (low current) condition and all the tunnel diode current passes through resistor 16 with the result that the base-emitter voltage of the transistor 15 is insufficient to cause transistor 15 to conduct and the voltage at collector electrode 17 is at its maximum positive value (which is approximately equal to the positive voltage of source 18). The application of a negative pulse to the tunnel diode 12 causes the diode to assume its low impedance high current state and the base-emitter voltage of the transistor 15 is now sufficient to turn transistor 15 "on." Most of the current now enters the base electrode 14 and is amplified and the collector output voltage assumes a less positive value. Thus application of a positive input pulse yields a larger positive output voltage at the collector 17 and a negative input pulse yields a less positive output pulse. Since the base current is amplified at the collector electrode 17 and since the output voltage is amplified with respect to the base-emitter voltage, both voltage and current gain are obtained at the collector electrode 17 and the output is non-inverted with respect to the input to the tunnel diode.

The above-described operation may be graphically analyzed by reference to FIG. 2. In FIG. 2A the input characteristics of resistor 16 and transistor 15 are plotted individually as well as in combination. In considering FIG. 2A the horizontal axis represents the voltage between the cathode 13 of tunnel diode 12 and ground and the vertical axis represents, when the characteristics of resistor 16 and transistor 15 are considered separately, either the current flowing through the resistor 16 or the base current of the transistor 15. The slope of the transistor characteristic has been significantly reduced in order to make FIG. 2A more understandable. In considering the combination of transistor 15 and resistor 16 the vertical axis represents the total current through the tunnel diode 12.

Below a predetermined value of base-emitter voltage substantially all of the tunnel diode current flows through resistor 16, while for base-emitter voltages in excess of that value substantially all of the tunnel diode current flows into the base of the transistor 15. The transistor is substantially conductive when a predetermined finite value of base input current, shown by the dotted horizontal line in FIGS. 2A and 2C, is exceeded. Below that finite value of base input current the transistor is non-conductive. The tunnel diode has a current versus voltage characteristic as shown in FIG. 2B. Since the tunnel diode is in series with the combination of resistor 16 and transistor 15, the characteristic of the combination shown in FIG. 2A and the characteristic of the tunnel diode shown in FIG. 2B may be added together to give the total characteristic shown in FIG. 2C. This total characteristic is obtained by adding together the voltage drops across the tunnel diode and resistor 16 transistor 15 combination for various currents, since the current through the tunnel diode is the same as that through the resistor 16 transistor 15 combination. The load line shown in FIG. 2C is determined by the values of resistors 19, 20 and 10 where resistor 19 connects the anode 11 of the tunnel diode to the source 18 and resistor 20 connects the anode 11 to ground. The two circled points in FIG. 2C represent the two bistable operating points of the circuit. As may be seen graphically in FIG. 2C, a positive pulse of voltage will drive the circuit from its "on" condition to its "off" condition while a negative pulse of voltage will cause the circuit to assume its "on" condition. Since the output voltage at the collector 17 is less positive when the circuit is in its "on" condition than when the circuit is in its "off" condition, the output voltage at collector electrode 17 is not inverted with respect to the input pulses applied to the tunnel diode by means of resistor 10. In addition, both voltage and current gain are obtained at collector electrode 17.

The circuit as above described uses an n-p-n type transistor and positive "turn off" input pulses and negative "turn on" input pulses; but negative "turn off" input pulses and positive "turn on" input pulses could also be used if the tunnel diode were arranged with its cathode 13 connected to resistor 10, anode 11 connected to base 14, the bias voltage 18 reversed in polarity, and a p-n-p type transistor 15 used.

In accordance with this invention, therefore, a bistable circuit is provided employing a single tunnel diode and a single transistor which retains the high speed of the tunnel diode, and, in addition, provides a non-inverted output, with respect to the input, which has both voltage and current gain.

It is to be understood that the above-described arrangements are illustrative of the application of the principles of the invention. Numerous other arrangements may be devised by those skilled in the art without departing from the spirit and scope of the invention.

What is claimed is:

1. A bistable circuit comprising, in combination, a single voltage controlled negative resistance tunnel diode having an anode and a cathode and a high impedance and a low impedance state, a transistor having a base electrode, an emitter electrode, and a collector electrode, said transistor being connected in the common emitter configuration and having substantially conducting and non-conducting states, output means connected to said collector electrode of said transistor means connecting said cathode of said tunnel diode to said base electrode of said transistor, a source of input pulses of positive and negative polarity connected to said anode of said tunnel diode, and a resistor connected across the base-emitter circuit of said transistor whose resistance is at least several times greater than the input impedance of said base-emitter circuit of said transistor in the conducting state so that said transistor conducts when an input pulse of a negative polarity causes said tunnel diode to assume its low input impedance state, but at least several times less than said input impedance of said transistor in the non-conducting state so that said transistor ceases to conduct when an input pulse of positive polarity causes said tunnel diode to assume its high impedance state.

2. A bistable circuit comprising, in combination, a single voltage controlled negative resistance tunnel diode having an anode and a cathode and a high impedance and a low impedance state, a transistor having a base electrode, an emitter electrode, and a collector electrode, said transistor being connected in the common emitter configuration and having substantially conducting and non-conducting states, output means connected to said collector electrode of said transistor means connecting the anode of said tunnel diode to said base electrode of said transistor, a source of input pulses of positive and negative polarity connected to the cathode of said tunnel diode, and a resistor connected across the base-emitter circuit of said transistor whose resistance is at least several times greater than the input impedance of the base-emitter circuit of said transistor in the conducting state so that said transistor conducts when an input pulse of a positive polarity causes said tunnel diode to assume its low impedance state, but at least several times less than said input impedance of said transistor in the non-conducting state so that said transistor ceases to conduct when an input pulse of negative polarity causes said tunnel diode to assume its high impedance state.

References Cited in the file of this patent

UNITED STATES PATENTS 3,040,190 Buelow -------------- June 19, 1962

OTHER REFERENCES

Publication—"Hughes Tunnel Diodes" by Hughes, Semiconductor Division (Advance Data) in Tentative Bulletin DS-83A-JM-9/60 (September 1960).

Publication—"Tunnel Diode Logic Circuits for Electron Data Processing Systems," in RCA Technical Notes, RCA TN No. 438, dated January 1961, Figure 5.